United States Patent [19]

Sakai et al.

[11] Patent Number: 4,799,120
[45] Date of Patent: Jan. 17, 1989

[54] GUARD PANEL FOR TAPE CASSETTES AND METHOD AND APPARATUS FOR MANUFACTURING THE SAME

[75] Inventors: Yoshimi Sakai; Yoshiki Satoh, both of Nagano, Japan

[73] Assignee: TDK Corporation, Japan

[21] Appl. No.: 778,620

[22] Filed: Sep. 23, 1985

[30] Foreign Application Priority Data

Sep. 25, 1984 [JP] Japan .................... 59-144772[U]

[51] Int. Cl.$^4$ .................................................. G11B 23/02
[52] U.S. Cl. .................................................. 360/132
[58] Field of Search .................... 360/132, 85, 93; 242/197–199; 206/387; 264/328.1, 328.9, 328.12; 425/533

[56] References Cited

U.S. PATENT DOCUMENTS

| | | | |
|---|---|---|---|
| 4,418,373 | 11/1983 | Fujimori et al. | 380/132 |
| 4,419,708 | 12/1983 | Ogiro et al. | 360/132 |
| 4,556,153 | 12/1985 | Takagi et al. | 360/132 |

FOREIGN PATENT DOCUMENTS

| | | | |
|---|---|---|---|
| 3042879 | 4/1981 | Fed. Rep. of Germany | 360/137 |
| 0210489 | 12/1982 | Japan | 360/132 |
| 0128070 | 7/1983 | Japan | 360/132 |

Primary Examiner—Stuart N. Hecker
Assistant Examiner—David J. Severin
Attorney, Agent, or Firm—Steinberg & Raskin

[57] ABSTRACT

A guard panel for tape cassettes and methods and apparatus for manufacturing the same wherein the guard panel comprises an upper plate portion which is devoid of cracks and deformation. The guard panel, which is adapted to be pivotally mounted on the cassette housing, comprises an elongated plate member including front, upper and side plate portions, each forming a side wall of the plate member. The upper plate portion includes at least two sections which differ in thickness from another section, the two sections being spaced from each other by a central section of the upper plate portion which is interposed between them in the longitudinal direction. The sections of the upper plate portion which differ in thickness from the other section may be in the form of recesses or protrusions formed in the upper plate portion and preferably on the back surface thereof. An additional recess or protrusion may be formed in the central section of the back surface of the upper plate portion. The guard panel is manufactured in a mold having a cavity block and a core block, the latter having a molding surface on which is provided at least two protrusions or recesses which are spaced from each other by a central portion of the molding surface interposed between them in the longitudinal direction. When molten plastic material is injected into the mold, the recesses or protrusions corresponding to the protrusions or recesses provided in the core block are formed on the back surface of the upper plate portion.

13 Claims, 4 Drawing Sheets

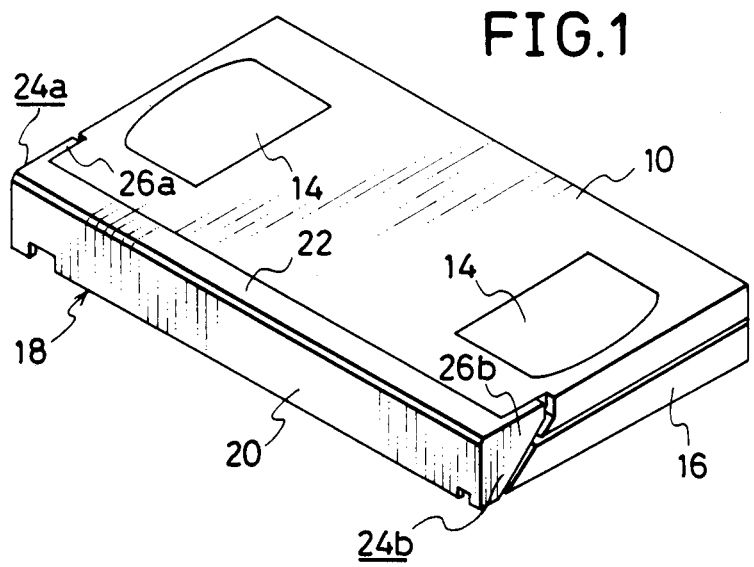
FIG.1
FIG.2(C) PRIOR ART
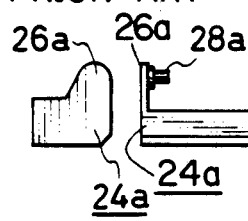
FIG.2(A) PRIOR ART
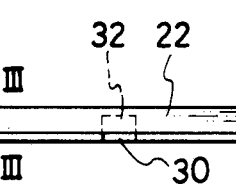
FIG.2(D) PRIOR ART
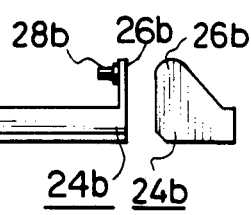
FIG.2(B) PRIOR ART
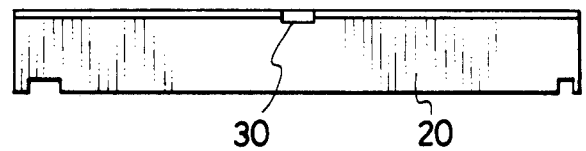
FIG.3
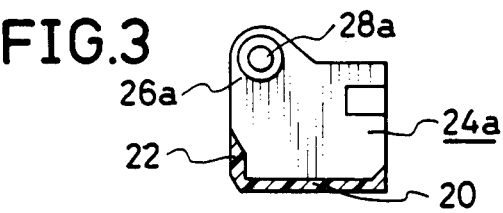

GUARD PANEL FOR TAPE CASSETTES AND METHOD AND APPARATUS FOR MANUFACTURING THE SAME

BACKGROUND OF THE INVENTION

The present invention relates generally to tape cassettes and, more particularly, to the construction and manufacture of a guard panel or lid forming a component of a video or audio tape cassette or cartridge which serves to selectively open and close an access opening provided in the cassette through which a magnetic head is inserted from the outside into the tape cassette.

Generally, a video or audio tape cassette is provided with a guard panel 18 (FIG. 1) which selectively opens and closes an access opening of the cassette through which a magnetic head is inserted during operation. During non-use of the tape cassette, the guard panel 18 is positioned to close the opening of the tape cassette to prevent the entry of dust carried in the air into the tape cassette. The guard panel also serves to prevent the operator from inadvertently touching the magnetic tape housed within the cassette during handling. Thus, the magnetic tape is protected from damage and contamination by the guard panel. If the magnetic tape is damaged or contaminated, a signal error may occur which will cause distortion of the displayed picture image in the case of video tape or interruption or distortion of reproduced sounds in the case of audio tape.

A tape cassette generally comprises a multi-part housing in which magnetic tape and other components are housed. Referring to FIG. 1, the housing comprises an upper half 10 and a lower half 16. Windows 14 through which the tape (not shown) can be viewed are provided in the upper half 10.

The guard panel 18 is pivotally mounted on the upper half 10 of the housing so that during non-use of the tape cassette, the guard panel 18 closes the access opening of the tape cassette as seen in FIG. 1. When the tape cassette is played, e.g., when the cassette is inserted into a tape deck (not shown) for operation, the guard panel 18 is unlocked and pivoted to an open position to provide access for the magnetic head to engage the tape within the cassette.

As seen in FIGS. 2(A)-2(D), 3 and 5, a conventional guard panel 18 comprises a narrow front plate portion 20 and a narrow upper plate portion 22. The plate portions 20 and 22 are joined to each other along respective longer sides thereof to form an integral elongated plate member having a substantially L-shaped transverse cross section. The plate member further comprises side plate portions 24a and 24b having respective projecting portions 26a and 26b, best seen in FIGS. 2A, 2C and 2D. Stub shafts 28a and 28b extend inwardly from projecting portions 26a and 26b which serve to pivotally mount the guard panel 18 to the upper half 10 of the housing. The stub shafts 28a and 28b are inserted into corresponding insertion holes (not shown) formed in the side walls near the front corner portions of the upper half 10 of the cassette housing.

As seen in FIGS. 2A and 2B, a recess 30 is formed on the surface of a central region of the elongated plate member at which the front plate portion 20 and upper plate portion 22 are joined to each other. Where the guard panel 18 is formed by means of injection molding, a molten plastic material is injected into a divisible mold provided with a cavity block and a core block through a gate formed in the cavity block. The recess 30 of the molded guard panel results from the presence of the gate in the mold.

Another recess 32 is formed in the central region of the back surface of the upper plate portion 22. In this connection the core block of the mold is provided with a protrusion which contacts the molten plastic material during the injection molding operation of guard panel 18 and results in the formation of the recess 32. It should be noted that this protrusion permits the molten plastic material which is injected into the mold to flow smoothly within the mold to provide the molded guard panel 18.

Referring to FIG. 4, a mold used for manufacturing the guard panel 18 is illustrated. The mold comprises a movable platen 34, a fixed platen 36, mounting plates 38a and 38b affixed to platens 34 and 36 respectively, back plates 40a and 40b of the mounting plates, a core plate 42, a cavity plate 44, a core block 46, a cavity block 48, a gate 52, spacer blocks 54a and 54b, an ejector plate 56 and ejector pins 58. The molded article, i.e., the guard panel, is designated 50 in FIG. 4. As is apparent from FIG. 4, molten plastic material is injected through the gate 52 to fill the space defined between the core block 46 and the cavity block 48 to form the molded article 50. When the mold is opened to remove the molded article 50, the core block 46 is moved in a direction opposite to the direction in which the cavity block 48 is moved, with the molded article 50 tightly adhering to the core block 46. At the same time, the ejector plate 56 is moved toward the cavity block 48 causing the molded article 50 to be pushed from the core block 46 by the ejector pins 58 which are affixed to the ejector plate 56. In this manner, the molded article 50, i.e., the guard panel, is removed from the core block 46.

In general, the mold is constructed to facilitate the release of the molded article 50 therefrom. Thus, the molded article 50 is readily released from the core block 46 by the pushing force of the ejector pins 58 as described above. Thus, during the injection molding operation, the back surface of the upper plate portion 22 is pushed at several points. Moreover, it should be noted that the stub shafts 28a and 28b which project inwardly from the side plate portions 24a and 24b of the guard panel 18 respectively, are readily released from the mold by a conventional mechanism (not shown) of the mold when the ejector pins 58 are pushed toward the cavity block 48.

It should be noted, however, that the front plate portion 20 and the upper plate portion 22 of guard panel 18 are joined to each other such that their longer sides intersect each other at substantially right angles. It therefore follows that the cavity block 48 must also provide a substantially right angle bend at the region at which the front and upper plate portions 20 and 22 are joined to each other. It is important to note, however, that only a slight withdrawing draft is present in the bend portion of the cavity block 48. Additionally, it is desired that the exposed or upper surface of the upper plate portion 22 be quite smooth and lustrous which requires that the surface of the molded article which will constitute the exposed surface of the upper plate portion 22 be in particularly tight contact with the cavity block 48.

If the mold is opened under these conditions, the molded article 50 is pulled with the surface of the molded upper plate portion 22 attached to the cavity block 48. As a result, the lustrous surface of the upper plate portion 22 is often deformed and cracks frequently occur, particularly at the regions near the side plate portions 24a and 24b, resulting in an unsatisfactory appearance and low mechanical strength of the guard panel.

FIG. 5 illustrates in exaggerated form the manner in which the guard panel is deformed and cracked as it is released from the mold. Specifically, the guard panel is cracked at the edge regions designated 60a and 60b. As seen in FIG. 5, the upper plate portion 22 is not substantially deformed at its central region but is deformed at regions lateral of the central region. As noted above, a protrusion (not shown) formed in the core block 46 is engaged by the molten plastic material during the molding operation to form the recess 32 at the central region of the back surface of the upper plate portion 22. The core block 46 strongly adheres to the central region of the upper plate portion 22 while the other regions of the upper plate portion 22 strongly adhere to the cavity block 48. It is therefore seen that the molded upper plate portion 22 will be deformed as it is removed from the mold in the manner shown in FIG. 5.

SUMMARY OF THE INVENTION

Accordingly, it is an object of the present invention to provide new and improved guard panels for tape cassettes which include upper plate portions which are devoid of cracks and which are deformation free and which exhibit satisfactory appearance.

Another object of the present invention is to provide new and improved methods and apparatus for manufacturing a guard panel having the characteristics noted above.

Briefly, in accordance with the present invention, these and other objects are attained by providing a guard panel for a tape cassette having a housing, the guard panel being pivotally mounted to the housing of the tape cassette. The guard panel comprises an elongated plate member having front and upper plate portions and has a substantially L-shaped transverse cross section, and side plate portions forming side walls of the elongate plate member.

According to the invention, the upper plate portion comprises at least two sections which differ in thickness from another section thereof, the two sections being spaced apart from each other with a central section of the upper plate portion being interposed between them in a longitudinal direction thereof. The sections of differing thickness may comprise recesses or protrusions and, preferably, are formed on the back surface of the upper plate portion. It is preferable that the sections of differing thickness be in the form of recesses since recesses permit the back surface of the upper plate portion to avoid contact with the surface of the upper half of the housing when the guard panel is swung about its pivot axis. Further, an additional recess or protrusion may be formed in the central section of the back surface of the upper plate portion.

A mold for manufacturing a guard panel in accordance with the invention comprises a cavity block and a core block. The surface of the core block is provided with at least two protrusions or recesses which are spaced apart from each other with a central portion of the molding surface of the core block interposed therebetween in a longitudinal direction thereof. When molten plastic material is injected into the mold, recesses or protrusions corresponding to the protrusion or recesses of the core block are formed on the back surface of the upper plate portion.

DESCRIPTION OF THE DRAWINGS

A more complete appreciation of the present invention and many of the attendant advantages thereof will be readily understood by reference to the following detailed description when considered in connection with the accompanying drawings in which:

FIG. 1 is a oblique view showing a video tape cassette provided with a guard panel;

FIGS. 2A to 2D show a conventional guard panel for a tape cassette, wherein FIG. 2A is a plan view, FIG. 2B is a front view, and FIGS. 2C and 2D are respective side elevation views;

FIG. 3 is a sectional view taken along line III—III of FIG. 2A;

DESCRIPTION OF THE PREFERRED EMBODIMENTS

Figure 6:
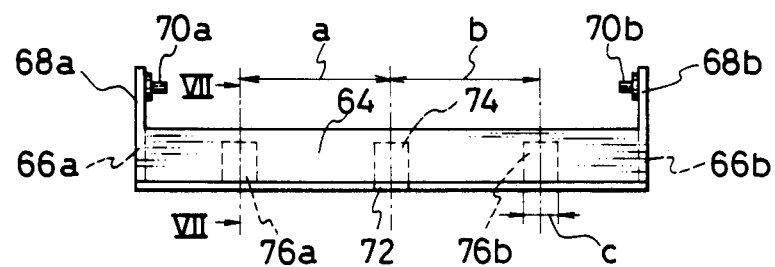
FIG. 6 is a plan view of the guard panel in accordance with one embodiment of the present invention.
Figure 7:
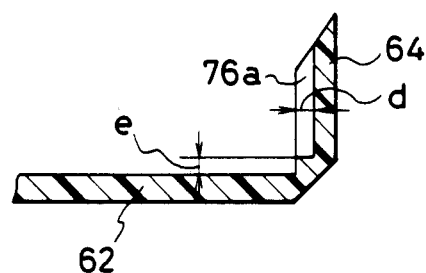
FIG. 7 is a section view taken along line VII—VII of FIG. 6.

Referring now to the drawings wherein like reference characters designate identical or corresponding parts throughout the several views, and more particularly FIGS. 6 and 7 which illustrate a guard panel for a tape cassette in accordance with one embodiment of the invention, the guard panel comprises a front plate portion 62, an upper plate portion 64 and side plate portions 66a and 66b. The side plate portions 66a and 66b include respective projecting portions 68a and 68b from which stub shafts 70a and 70b extend inwardly.

A recess 72 is formed on the surface of a region at which the front plate portion 62 and the upper plate portion 64 are joined to each other and a rectangular recess 74 is formed in the central region of the back surface of the upper plate portion 64. The recess 72 results from the presence of the gate of the mold used in the manufacture of the guard panel. On the other hand, the rectangular recess 74 results from the provision of a protrusion on the part of the molding surface of the core block of the mold that faces the gate.

Figure 4:
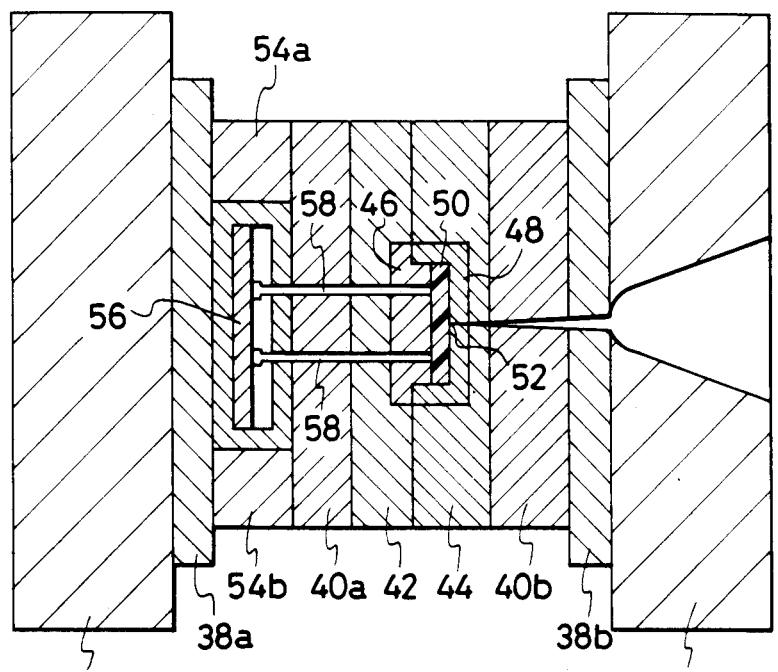
FIG. 4 is a sectional view of a mold for use in the manufacture of a guard panel in accordance with the present invention.
Figure 5:
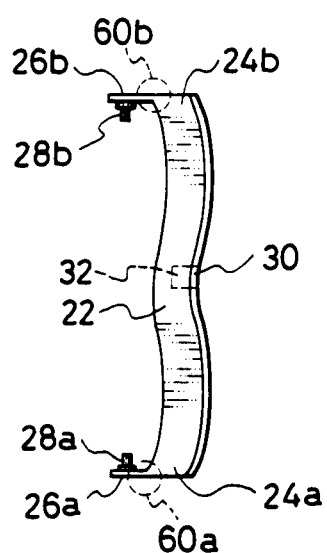
FIG. 5 is a plan view of a guard panel and illustrating in exaggerated form the deformation thereof caused during the release of the guard panel from the mold.

The guard panel also comprises rectangular recesses 76a and 76b, each having a width c, formed on the back surface of the upper plate portion 64 at positions which are spaced apart from each other with the central region of the upper plate portion 64 interposed between them. Specifically, a distance a is provided in the longitudinal direction of the upper plate portion 64 between the center of recess 76a and the center of upper plate portion 64. A distance b is provided between the center of recess 76b and the center of the upper plate portion 64 as seen in FIG. 6. The recesses 76a and 76b have a depth d and are positioned a distance e from the back surface of the front plate portion 62 as seen in FIG. 7, only the recess 76a being shown in FIG. 7.

Where the guard panel having an upper plate portion 64 of the construction described above is manufactured using a mold of the type shown in FIG. 4, the recesses 76a and 76b, as well as the recess 74 which is substantially similar in shape to the recesses 76a and 76b, are in tight contact with the three protrusions (not shown) formed on the core block 46 of the mold which correspond to the three recesses. This in turn provides an increased holding strength of the core block 46 relative to the upper plate portion 64. It is important to note that since the upper plate portion 64 is provided with the recesses 76a and 76b as well as recess 74, the holding strength of the core block relative to the upper plate portion 64 is substantially uniformly distributed. Thus, the holding strength mentioned above is capable of suitably accommodating the pulling force of the molding surface of the cavity block 48 of the mold that is exerted on the surface of the upper plate portion 64. It therefore follows that the upper plate portion 64 is prevented from deforming during separation from the mold and the formation of cracks due to such deformation is substantially eliminated.

Figure 8:
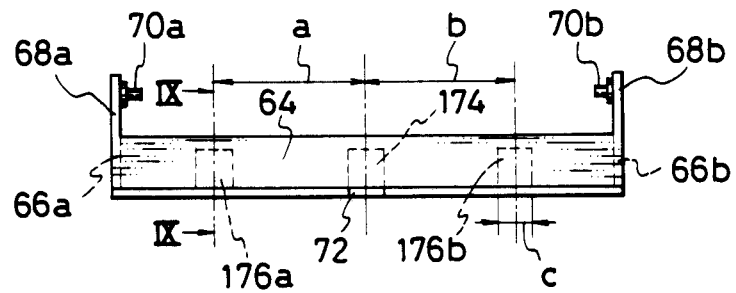
FIG. 8 is a plan view of a guard panel in accordance with another embodiment of the present invention.
Figure 9:
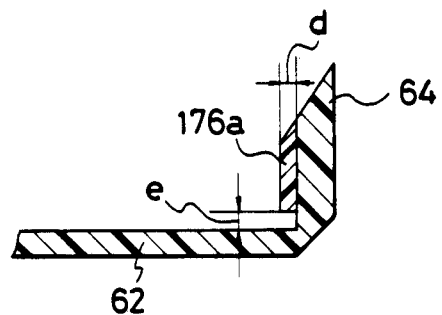
FIG. 9 is a section view taken along line IX—IX of FIG. 8.

Another embodiment of a guard panel in accordance with the invention is illustrated in FIGS. 8 and 9. In accordance with this embodiment, three protrusions 176a, 176b and 174 are formed on the back surface of the upper plate portion 64 instead of the three recesses 76a, 76b and 74 shown in the embodiment of FIGS. 6 and 7. This embodiment produces similar effects to those obtained in the embodiment of FIGS. 6 and 7.

The reference dimensions a, b, c, d and e, shown in FIGS. 8 and 9 are substantially the same as those designated in FIGS. 6 and 7.

It is seen from the foregoing that a guard panel in accordance with the invention has an upper plate portion 64, having at least two sections (those sections in the regions of recesses 76a and 76b or in the regions of protrusions 176a and 176b) which differ in thickness from other sections of the upper plate portion. These sections are spaced apart from each other by a central region of the upper plate portion which is interposed between them in a longitudinal direction. This results in the uniform distribution of the holding forces exerted by the core block on the upper plate portion 64 to accommodate the forces exerted by the molding surface of the cavity block 48 of the mold on the surface of the upper plate portion 64.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. A guard panel for a tape cassette having a housing, said guard panel being pivotally mounted on the housing and comprising:

an elongated plate member having a front plate portion, an upper plate portion and side plate portions forming side walls of said plate member, said front and upper plate portions together forming a substantially L-shaped transverse cross section with an outer front surface and an inner back surface when viewed in a transverse direction;

wherein said upper plate portion has at least two sections which differ in thickness from another section of said upper plate portion, said at least two sections being spaced apart from each other with a central region of said upper plate portion being situated between them in a longitudinal direction thereof; and wherein said at least two sections of said upper plate portion which differ in thickness from another section of said upper plate portion are constituted by recesses formed only in said back surface of said upper plate portion and terminating at a point away from an outermost edge of said upper plate portion situated away from juncture of said upper and front plate portions in said substantially L-shaped configuration at said back surface thereof to thereby mitigate deformation and cracking of said guard panel.

2. The combination of claim 1, wherein each of said recesses is substantially rectangular.

3. The combination of claim 1 wherein said upper plate portion further includes a recess formed in said central section thereof.

4. The combination of claim 3, wherein all of said recesses are substantially rectangular.

5. The combination of claim 3, wherein all of said recesses are of substantially the same size.

6. A guard panel for a tape cassette having a housing, said guard panel being pivotally mounted on the housing and comprising:

a elongated plate member having a front plate portion, an upper plate portion and side plate portions forming side walls of said plate member, said front and upper plate portions together forming a substantially L-shaped transverse cross section with an outer front surface and an inner back surface when viewed in said transverse direction;

wherein said upper plate portion has at least two sections which differ in thickness from another section of said upper plate portion, said at least two sections being spaced apart from each other with a central section of said upper plate portion being situated between them in a longitudinal direction thereof; and wherein said at least two sections of said upper plate portion which differ in thickness from another section of said upper plate portion are constituted by protrusions formed only in said back surface of said upper plate portion, terminating at a point away from an outer edge of said upper plate portion situated away from juncture of said upper and front plate portions at said back surface thereof, and being spaced away from said back surface juncture to thereby mitigate deformation and cracking of said guard panel.

7. The combination of claim 6, wherein each of said protrusions is substantially rectangular.

8. The combination of claim 6 wherein said upper plate portion further includes a protrusion formed in said central section thereof.

9. The combination of claim 8, wherein all of said protrusions are substantially rectangular.

10. The combination of claim 8, wherein all of said protrusions are of substantially the same size.

11. The combination of claim 8, additionally comprising a recess formed on a surface of a region at which said front plate portion and said upper plate portion are joined to each other and adjacent said protrusion formed in said central region of said upper plate portion.

12. A tape cassette, comprising:
a housing;

a guard panel pivotally mounted on said housing and comprising an elongated plate member having a front plate portion, an upper plate portion and side plate portions forming side walls of said plate member, said front and upper plate portions together forming a substantially L-shaped transverse cross section with an outer front surface and an inner back surface when viewed in said transverse direction;

wherein said upper plate portion has at least two sections which differ in thickness from another section of said upper plate portion, said at least two sections being spaced apart from each other with a central region of said upper plate portion being situated betweem them in a longitudinal direction thereof; and wherein said at least two sections of said upper plate portion which differ in thickness from another section of said upper plate portion are constituted by recesses formed only in said back surface of said upper plate portion and terminating at a point away from an outermost edge of said upper plate portion situated away from said juncture of said upper and front plate portions in said substantially L-shaped configuration at said back surface, and said recesses each being spaced substantially inwardly in said transverse direction from transversely protruding stub shafts mounted on said side plate portions of said elongated member to thereby mitigate deformation and cracking of said guard panel.

13. A tape cassette, comprising:
a housing;

a guard panel pivotally mounted on said housing and comprising an elongated plate member having a front plate portion, an upper plate portion and side plate portions forming side walls of said plate member, said front and upper plate portions together forming a substantially L-shaped transverse cross-section with an outer front surface and an inner back surface when viewed in said transverse direction;

wherein said upper plate portion has at least two sections which differ in thickness from another section of said upper plate portion, said at least two sections being spaced apart from each other with a central section of said upper plate portion being situated between them in a longitudinal direction thereof; and wherein said at least two sections of said upper plate portion which differ in thickness from another section of said upper plate portion are constituted by protrusions formed only in said back surface of said upper plate portion and terminating at a point away from an outermost edge of said upper plate portion situated away from juncture of said upper and front plate portions in said substantially L-shaped configuration at said back surface, said protrusions each being spaced away from said back surface juncture, and said protrusions each being spaced substantially inwardly in said transverse direction from transversely protruding stub shafts mounted on said side plate portions of said elongated member to thereby mitigate deformation and cracking of said guard panel.

* * * * *